(12) United States Patent
Jeong et al.

(10) Patent No.: US 8,810,933 B2
(45) Date of Patent: Aug. 19, 2014

(54) LENS UNIT, MANUFACTURING METHOD OF THE SAME, AND CAMERA MODULE INCLUDING THE SAME

(75) Inventors: Seung Man Jeong, Seoul (KR); Kee Tae Um, Seoul (KR); Sung Phil Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 7 days.

(21) Appl. No.: 13/537,801

(22) Filed: Jun. 29, 2012

(65) Prior Publication Data

US 2013/0003199 A1    Jan. 3, 2013

(30) Foreign Application Priority Data

Jun. 30, 2011    (KR) .................. 10-2011-0064829
Jun. 30, 2011    (KR) .................. 10-2011-0064833

(51) Int. Cl.
*G02B 7/02* (2006.01)

(52) U.S. Cl.
USPC .......................................... 359/819; 359/811

(58) Field of Classification Search
USPC .................. 359/694–704, 811–830, 646
See application file for complete search history.

(56) References Cited

U.S. PATENT DOCUMENTS

| | | | | |
|---|---|---|---|---|
| 7,800,847 B2* | 9/2010 | Nagai et al. | ................... | 359/813 |
| 8,432,625 B2* | 4/2013 | Duparre et al. | ............... | 359/811 |
| 2010/0045845 A1 | 2/2010 | Yoneyama | | |
| 2011/0063487 A1 | 3/2011 | Yamada et al. | | |
| 2011/0063734 A1 | 3/2011 | Sakaki | | |
| 2011/0211105 A1 | 9/2011 | Yamada et al. | | |

FOREIGN PATENT DOCUMENTS

| | | | |
|---|---|---|---|
| JP | 2002-290842 A | 10/2002 | |
| JP | 2009-300596 A | 12/2009 | |
| JP | 2010-204631 A | 9/2010 | |
| JP | 2011-084060 A | 4/2011 | |
| JP | 2011-180292 A | 9/2011 | |

OTHER PUBLICATIONS

Office Action dated Aug. 27, 2013 in Japanese Application No. 2012-146775, filed Jun. 29, 2012.
Office Action dated Jun. 12, 2014 in Taiwanese Application No. 101123574.

* cited by examiner

*Primary Examiner* — Mohammad Hasan
(74) *Attorney, Agent, or Firm* — Saliwanchik, Lloyd & Eisenschenk

(57) ABSTRACT

Disclosed are a lens unit and a method of manufacturing the same. The lens unit includes a lens part including a curved region having a predetermined curvature; and a support part including a hole, in which the lens part is installed, and attached to the lens part at a lateral side of the hole. The lens part having the curvature and the support part of the lens unit are formed in separate processes such that the hole is formed in the support part having the strength, and the lens part is formed by filling the hole with the lens part, so that the movement of resin caused by shrinkage of the lens part when the lens part is cured is inhibited, and the support part and the lens part does not form the layered structure, thereby allowing the lens unit to be formed with a thin thickness.

10 Claims, 7 Drawing Sheets

LENS UNIT, MANUFACTURING METHOD OF THE SAME, AND CAMERA MODULE INCLUDING THE SAME

CROSS-REFERENCE TO RELATED APPLICATIONS

This application claims the benefit under 35 U.S.C. §119 of Korean Patent Application Nos. 10-2011-0064829, filed Jun. 30, 2011, and 10-2011-0064833, filed Jun. 30, 2011, which are hereby incorporated by reference in their entirety.

BACKGROUND

The embodiment relates to a lens unit, a manufacturing method of the same, and a camera module including the same.

Recently, a camera module has been installed in a mobile communication terminal, an information technology (IT) device, such as a PDA or an MP3 player, a vehicle, and an endoscope. As the technology has been developed toward the high-pixel camera module from the conventional VGA camera equipped with 0.3 mega pixels, the camera module has been manufactured in a small size with a slim structure according to targets to which the camera module is installed. In addition, the camera module has been equipped with various additional functions, such as auto-focusing or optical zoom functions, at the low manufacturing cost.

Meanwhile, the camera module manufactured in these days is equipped with an image sensor module, which is manufactured through a COB (chip of board) scheme, a COF (chip of flexible) scheme or a CSP (chip scale package) scheme, and is usually connected to a main substrate through an electric connection unit, such as a PCB (printed circuit board) or an FPCB (flexible printed circuit board).

However, users recently request the camera module, which can be directly mounted on the main substrate similar to a general passive element, in such a manner that the manufacturing process for the camera module can be simplified while reducing the manufacturing cost.

The camera module is generally manufactured by attaching an image sensor, such as a CCD or a CMOS, to a substrate through the COB scheme or the COF scheme. An image of a subject is focused by the image sensor and the focused image is stored as data in a memory, which is installed inside or outside the camera module. In addition, the stored data are converted into electric signals and the electric signals are displayed as images through a display medium, such as an LCD or a PC monitor provided in a device.

A camera module according to the related art includes a housing, an image sensor supported on a bottom of the housing to convert an image signal received through a lens into an electric signal, a lens group to focus an image signal of a subject to the image sensor, and a barrel in which the lens group are stacked. The housing, the lens group and the barrel are sequentially coupled with each other.

In addition, an FPCB mounted thereon with chip components, which are electric components serving as a condenser and a resistor to drive the image sensor including a CCD or a CMOS, is electrically connected to the bottom of the housing.

In the camera module having the above structure according to the related art, in a state that a plurality of circuit components have been mounted on the FPCB, an ACF (anisotropic conductive film) is inserted between the substrate and the image sensor, and heat and pressure are applied thereto in such a manner that the substrate, the image sensor and the ACF are fixedly bonded and electrically connected with each other and an IR cut-off filter is attached to an opposite side.

In addition, in a state that the barrel provided therein with a plurality of lens groups is temporally screw-coupled with the housing, as described above, the assembled FPCB is fixedly bonded to the bottom of the housing by an adhesive.

Meanwhile, after the FPCB, to which the image sensor is attached, has been fixedly bonded to the housing coupled with the barrel, a focus adjustment is carried out with respect to a subject (resolution chart) located in front of the barrel and spaced apart from the barrel by a predetermined distance. At this time, the focus adjustment of the camera module can be achieved between the lens group and the image sensor while adjusting the vertical displacement by rotating the barrel screw-coupled with the housing.

BRIEF SUMMARY

The embodiment provides a lens unit, which can be easily manufactured with high heat-resistance and represent a superior optical performance, a method of manufacturing the same, and a camera module including the same.

A lens unit according to the embodiment includes a lens part including a curved region having a predetermined curvature; and a support part including a hole, in which the lens part is installed, and attached to the lens part at a lateral side of the hole.

A camera module according to the embodiment includes a first lens unit comprising a first lens part including a curved region having a predetermined curvature, and a support part including a hole, in which the lens part is installed, and attached to the lens part at a lateral side of the hole; an opaque spacer on the first lens unit; a second lens unit on the spacer; and a sensor part under the first lens unit.

A method of manufacturing a lens unit according to the embodiment includes the steps of preparing a preliminary lens array substrate including an opening for exposing a lens region where a lens part is formed; placing the preliminary lens array substrate at an inside of a mold; forming the lens part in the opening by injecting a resin material into the inside of the mold such that the opening is filled with the resin material and curing the resin material; and cutting the preliminary lens array substrate.

According to the embodiment, the lens part having the curvature and the support part of the lens unit are formed in separate processes such that the hole can be formed in the support part having the strength, and the lens part is formed by filling the hole with the lens part, so that the movement of resin caused by shrinkage of the lens part when the lens part is cured can be inhibited, and the support part and the lens part may not form the layered structure, thereby allowing the lens unit to be formed with a thin thickness.

DETAILED DESCRIPTION

Figure 1:
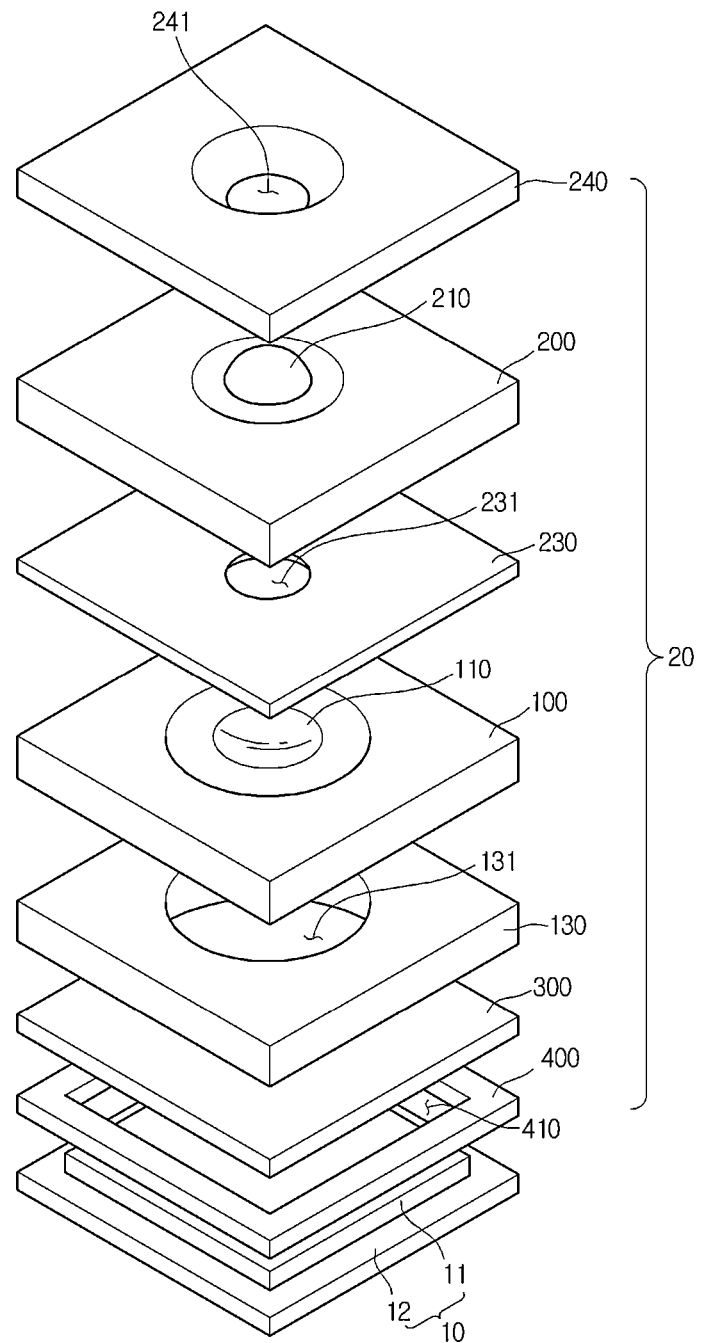
FIG. 1 is an exploded perspective view showing a camera module according to the embodiment.

In the description of the embodiments, it will be understood that when each lens, unit, part, hole, protrusion, groove or layer is referred to as being "on" or "under" another lens, unit, part, hole, protrusion, groove or layer, it can be "directly" or "indirectly" on the other lens, unit, part, hole, protrusion, groove or layer or one or more intervening layers may also be present. Such a position has been described with reference to the drawings. The thickness and size of each layer shown in the drawings may be exaggerated, omitted or schematically drawn for the purpose of convenience or clarity. In addition, the size of elements does not utterly reflect an actual size.

Figure 2:
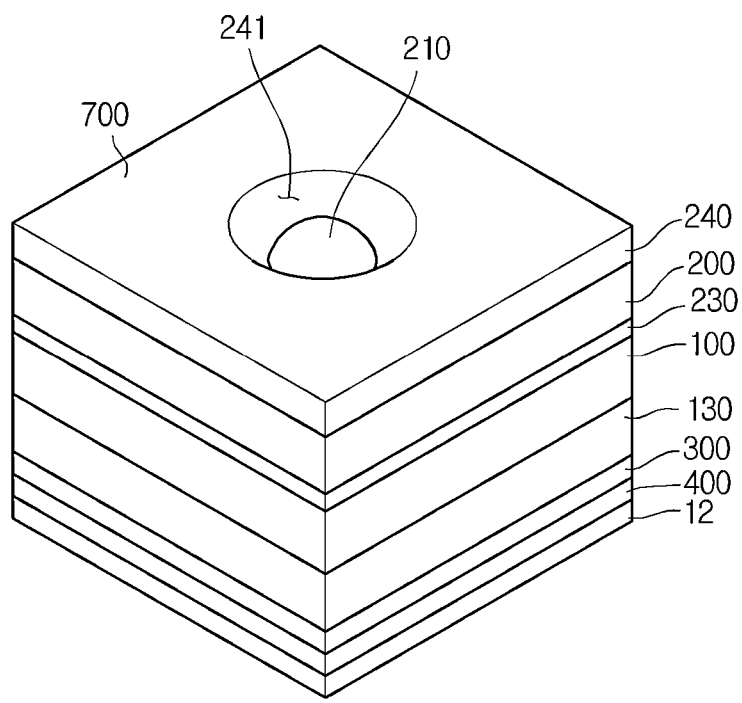
FIG. 2 is a perspective view showing a camera module according to the embodiment.
Figure 3:
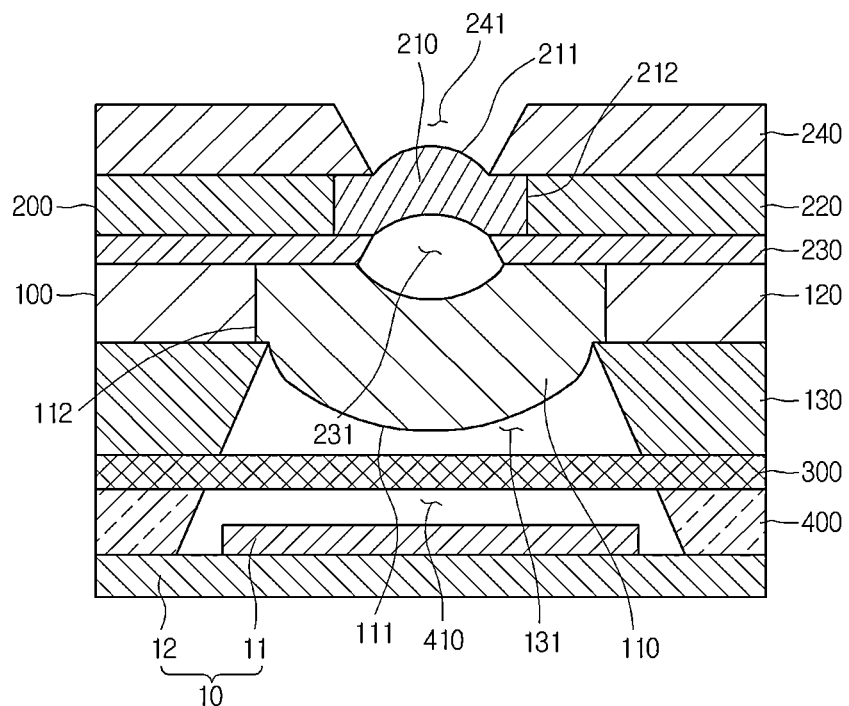
FIG. 3 is a sectional view taken along line A-A' of FIG. 2.

FIG. 1 is an exploded perspective view showing a camera module according to the embodiment, FIG. 2 is a perspective view showing the camera module according to the embodiment, and FIG. 3 is a sectional view taken along line A-A' of FIG. 2.

Referring to FIGS. 1 to 3, the camera module according to the embodiment includes a lens assembly 20 and a sensor part 10.

The lens assembly 20 outputs light to the sensor part 10 by improving the characteristic of the light incident from the outside. The lens assembly 20 can collect the incident light. The lens assembly 20 includes a first lens unit 100, a second lens unit 200, an optical filter 300 and a third spacer 400.

The first lens unit 100 improves the characteristic of the light incident thereto through the second lens unit 200. As shown in FIG. 3, the first lens unit 100 includes a first lens part 110 and a first support part 120.

The first lens part 110 has a curved region 111 having a predetermined curvature. In addition, the first lens part 110 has a flat region 112 extending in the lateral direction from the curved region 111. In detail, the first lens part 110 may include a convex surface and a concave surface, which are opposite to each other. The first lens part 110 refracts the incident light. The curved region of the first lens part 110 has a diameter of about 0.5 mm to about 3 mm.

The first support part 120 is disposed around the first lens part 110. In detail, the first support part 120 has a hole in which the first lens part 110 is installed. That is, the first lens part 110 is disposed in the hole such that the first lens part 110 can be attached to a lateral side of the hole. In detail, a lateral side of the first lens part 110 may adhere to the inner wall of the hole. In more detail, the lateral side of the first lens part 110 may be integrally formed with the inner wall of the hole. The first lens part 120 supports the first lens part 110.

The first lens part 120 may have a plate shape. The first support part 120 is integrally formed with the first lens part 110. When viewed from the top, the first support part 120 has a rectangular shape. The first support part 120 may have a width of about 5 mm to about 10 mm.

The first lens unit 100 includes plastic. In detail, the first lens part 110 includes resin. The first lens part 110 may include plastic having higher heat-resistance characteristic.

The plastic used for the first lens part 110 is rarely deformed at the temperature of about 200° C. to about 350° C. For instance, the glass transition temperature of the plastic used for the first lens part 110 is in the range of about 130° C. to about 250° C. Preferably, the glass transition temperature of the plastic used for the first lens part 110 is in the range of about 200° C. to about 250° C. In addition, the melting point of the plastic used for the first lens part 110 is in the range of about 350° C. to about 450° C.

The first lens part 110 and the first support part 120 may be transparent. In addition, the first lens part 110 and the first support part 120 may include materials different from each other. The first lens part 110 may include thermoplastic resin, thermosetting resin or photo-curable resin. For instance, the first lens part 110 may include carbonate-based resin, such as polycarbonate (PC), or acryl-based resin, such as polymethylmethacrylate (PMMA).

The first support part 120 may include glass, thermosetting resin or photo-curable resin.

In particular, the first lens part 110 includes photo-curable resin and the first support part 120 includes thermosetting resin or photo-curable resin.

In addition, the first lens part 110 may include polymer and the first support part 120 may include glass.

Further, the first lens part 110 is transparent and the first support part 120 is semi-transparent or opaque.

In addition, the first support part 120 has a relatively high hardness and the first support part 120 has a relatively low hardness.

When the first support part 120 includes the thermosetting resin or photo-curable resin, the first lens part 110 may include the same resin.

The first lens part 110 is disposed corresponding to a second perforation hole 231 of a second spacer 230 formed on the first lens part 110 and has a peripheral region extending to the first support part 120 from the curved region exposed through the second perforation hole 231 of the second spacer 230.

In this manner, the first lens part 110 is coupled with the first support part 120 at the peripheral region disposed around the curved region, so the boundary region between the first lens part 110 and the first support part 120 is covered with the second spacer 230, thereby inhibiting the boundary region from being exposed to the second perforation hole caused by the misalignment.

A first spacer 130 is disposed under the first support part 120. The first spacer 130 may be directly bonded to the first support part 120.

The first spacer 130 is opaque. The first spacer 130 is interposed between the first support part 120 and the optical filter 300. The first spacer 130 is bonded to the top surface of the optical filter 300. A lateral side of the first spacer 130 is aligned on the same plane with a lateral side of the first support part 120.

The first spacer 130 includes a first perforation hole 131. The first perforation hole 131 corresponds to the concave region of the first lens part 110. The center of the first perforation hole 131 substantially matches with the center of the first lens part 110.

An inner wall of the first perforation hole 131 may be inclined with respect to the top surface of the first support part 120. In detail, the inner wall of the first perforation hole 131 may be inclined at an angle of about 40° to about 60° with respect to the top surface of the first support part 120.

The inclination direction of the inner wall of the first perforation hole 131 is substantially identical to the route of the incident light. Thus, the angle of the inner wall of the first perforation hole 131 may vary depending on the optical design of the first lens part 110.

A diameter of the first perforation hole 131 is gradually enlarged proportionally to the distance with respect to the first lens unit 100. In contrast, the diameter of the first perforation hole 131 may be gradually reduced proportionally to the distance with respect to the first lens unit 100.

An upper outer peripheral portion of the first perforation hole 131 corresponds to the concave region of the first lens part 110 and the boundary region between the first lens part 110 and the first support part 120 is blocked by the first spacer 130.

Since the inner wall of the first perforation hole 131 is inclined, the light passing through the first lens part 110 can be effectively incident into the optical filter 300. In particular, since the upper outer peripheral portion of the first perforation hole 131 corresponds to the first lens part 110, undesired light causing noise may be effectively removed by the first spacer 130.

The first spacer 130 includes plastic. The first spacer 130 may include a material the same as that of the first lens part 110 and the first support part 120. For instance, the first spacer 130 may include colored dye, such as black dye, and plastic used for the first lens part 110 and the first support part 120.

Otherwise, the first spacer 130 may include a material different from the material for the first lens part 110 and the first support part 120.

The first spacer 130 may include thermoplastic resin, thermosetting resin or photo-curable resin. For instance, the first spacer 130 may include plastic having the high heat-resistance characteristic, such as polyether ether ketone (PEEK), polyethylene naphthalate (PEN), polyimide (PI) or liquid crystal polymer, in addition to carbonate-based resin, such as polycarbonate (PC), and acryl-based resin, such as polymethylmethacrylate (PMMA).

The second lens unit 200 is disposed above the first lens unit 100. The second lens unit 200 outputs light to the first lens unit 100 by improving the characteristic of the light incident from the outside.

Figure 5:
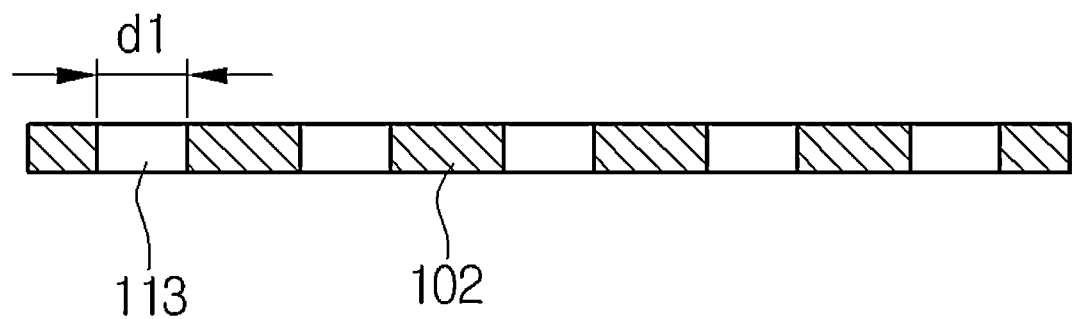

As shown in FIGS. 3 and 5, the second lens unit 200 includes a second lens part 210 and a second support part 220.

The second lens part 210 has a curved region 211 having a predetermined curvature. In addition, the second lens part 210 has a flat region 212 extending in the lateral direction from the curved region 211. In detail, the second lens part 210 includes the flat region 212 surrounding the curved region 211 and extending to the second support part 220. The flat region 212 includes a material the same as that of the curved region 211.

In detail, the curved region 211 of the second lens part 210 may include a convex surface and a concave surface, which are opposite to each other. The second lens part 210 refracts the incident light. The curved region 211 of the second lens part 210 has a diameter of about 0.5 mm to about 3 mm.

The second support part 220 is disposed around the second lens part 210. In detail, the second support part 220 has a hole in which the second lens part 210 is installed. That is, the second lens part 210 is disposed in the hole such that the second lens part 210 can be attached to a lateral side of the hole. In detail, a lateral side of the second lens part 210 may adhere to the inner wall of the hole. In more detail, the lateral side of the second lens part 210 may be integrally formed with the inner wall of the hole.

The second lens part 220 supports the second lens part 210.

The second lens part 220 may have a plate shape. The second support part 220 is integrally formed with the second lens part 210. When viewed from the top, the second support part 220 has a rectangular shape. The second support part 220 may have a width of about 5 mm to about 10 mm.

The second lens unit 200 includes plastic. In detail, the second lens part 210 includes polymer. The second lens part 210 may include plastic having higher heat-resistance characteristic.

The plastic used for the second lens part 210 is rarely deformed at the temperature of about 200° C. to about 350° C. For instance, the glass transition temperature of the plastic used for the second lens part 210 is in the range of about 130° C. to about 250° C. Preferably, the glass transition temperature of the plastic used for the second lens part 210 is in the range of about 200° C. to about 250° C. In addition, the melting point of the plastic used for the second lens part 210 is in the range of about 350° C. to about 450° C.

The second lens part 210 may include thermoplastic resin, thermosetting resin or photo-curable resin. For instance, the second lens part 210 may include carbonate-based resin, such as polycarbonate (PC), or acryl-based resin, such as polymethylmethacrylate (PMMA).

The second lens part 210 and the second support part 220 may be transparent. In addition, the second lens part 210 and the second support part 220 may include materials different from each other.

The second support part 220 may include glass, thermosetting resin or photo-curable resin. When the second support part 220 includes the thermosetting resin or photo-curable resin, the second lens part 210 may include the same resin. However, since the curing temperature and the composition may vary, the boundary region may be formed between the second support part 220 and the second lens part 210.

The second support part 220 can be formed by using glass, thermosetting resin or photo-curable resin.

In particular, the second lens part 210 includes photo-curable resin and the second support part 220 includes thermosetting resin or photo-curable resin.

In addition, the second lens part 210 may include polymer and the second support part 220 may include glass.

Further, the second lens part 210 is transparent and the second support part 220 is semi-transparent or opaque.

In addition, the second support part 220 has a relatively high hardness and the second support part 220 has a relatively low hardness.

The second spacer 230 is disposed under the second lens part 210. The second spacer 230 may be directly bonded to the second support part 220.

The second spacer 230 is opaque. The second spacer 230 is interposed between the second support part 220 and the first lens unit 100. The second spacer 230 is bonded to the top surface of the first lens unit 100. A lateral side of the second spacer 230 is aligned on the same plane with a lateral side of the second support part 220.

The second spacer 230 includes the second perforation hole 231. The second perforation hole 231 corresponds to the curved region of the second lens part 210. The center of the second perforation hole 231 substantially matches with the center of the second lens part 210.

An inner wall of the second perforation hole 231 may be inclined with respect to the top surface of the second support part 220. In detail, the inner wall of the second perforation hole 231 may be inclined at an angle of about 40° to about 60° with respect to the top surface of the second support part 220.

The inclination direction of the inner wall of the second perforation hole 231 is substantially identical to the route of the incident light. Thus, the angle of the inner wall of the second perforation hole 231 may vary depending on the optical design of the second lens part 210.

A diameter of the second perforation hole 231 is gradually enlarged proportionally to the distance with respect to the second lens unit 200. In contrast, the diameter of the second perforation hole 231 may be gradually reduced proportionally to the distance with respect to the second lens unit 200.

An upper outer peripheral portion of the second perforation hole 231 may deviate from the boundary region between the second lens part 210 and the second support part 220. That is, the boundary region between the second lens part 210 and the second support part 220 may not be exposed through the second perforation hole 231, but coved with the second spacer 230, so the optical error caused by the boundary region upon the misalignment can be reduced.

In addition, a lower outer peripheral portion of the second perforation hole 231 deviates from the boundary region between the first lens part 110 and the first support part 120.

Since the inner wall of the second perforation hole 231 does not expose the boundary region between the second lens part 210 and the second support part 220 and the boundary region between the first lens part 110 and the first support part 120, undesired light causing noise may be effectively removed by the second spacer 230.

A light blocking part 240 is disposed on the top surface of the second support part 220. The light blocking part 240 is opaque and selectively blocks the incident light.

An outer peripheral portion of the light blocking part 240 matches with an outer peripheral portion of the second support part 220. That is, a lateral side of the light blocking part 240 may be aligned on the same plane with a lateral side of the second support part 220 and a lateral side of the second spacer 230.

The light blocking part 240 includes a fourth perforation hole 241. The fourth perforation hole 241 corresponds to the curved regions of the first and second lens parts 110 and 210. The center of the fourth perforation hole 241 substantially matches with the centers of the first and second lens parts 110 and 210.

An inner wall of the fourth perforation hole 241 may be inclined with respect to the top surface of the light blocking part 240. In detail, the inner wall of the fourth perforation hole 241 may be inclined at an angle of about 30° to about 70° with respect to the top surface of the light blocking part 240.

The inclination direction of the inner wall of the fourth perforation hole 241 is substantially identical to the route of the incident light. Thus, the angle of the inner wall of the fourth perforation hole 241 may vary depending on the optical design of the second lens unit 200. A diameter of the fourth perforation hole 241 is gradually enlarged proportionally to the distance with respect to the first lens unit 100.

A lower outer peripheral portion of the fourth perforation hole 241 may deviate from the boundary region between the second lens part 210 and the second support part 220.

Since the inner wall of the fourth perforation hole 241 is inclined with respect to the top surface of the light blocking part 240, the light can be effectively incident to the second lens part 210 from the outside. In particular, since the lower outer peripheral portion of the fourth perforation hole 241 does not expose the boundary region between the second lens part 210 and the second support part 220, undesired light causing noise may be effectively removed by the light blocking part 240.

The second spacer 230 and the light blocking part 240 include plastic. The second spacer 230 and the light blocking part 240 may include a material the same as that of the second lens part 210 and the second support part 220. For instance, the second spacer 230 and the light blocking part 240 may include colored dye, such as black dye, and plastic used for the second lens part 210 and the second support part 220.

Otherwise, the second spacer 230 and the light blocking part 240 may include a material different from the material for the second lens part 210 and the second support part 220.

The second spacer 230 and the light blocking part 240 may include thermoplastic resin, thermosetting resin or photo-curable resin. For instance, the second spacer 230 may include plastic having the high heat-resistance characteristic, such as polyether ether ketone (PEEK), polyethylene naphthalate (PEN), polyimide (PI) or liquid crystal polymer, in addition to carbonate-based resin, such as polycarbonate (PC), and acryl-based resin, such as polymethylmethacrylate (PMMA).

Although the present embodiment has been described with reference to the camera module including two lens units 100 and 200, the embodiment is not limited thereto. For instance, the camera module according to the embodiment may include at least three lens units.

The optical filter 300 is disposed under the first lens unit 100. The optical filter 300 is an infrared filter for filtering infrared ray. The optical filter 300 can be formed by coating a material capable of filtering the infrared ray on a glass substrate.

The optical filter 300 blocks the infrared ray by filtering the light passing through the optical filter 300. The optical filter 300 may be bonded to the second spacer 230 and the third spacer 400. In addition, a lateral side of the optical filter 300 may be aligned on the same plane with a lateral side of the first lens unit 100. That is, the lateral sides of the optical filter 300, the first lens unit 100 and the second unit 200 are cutting surfaces which are simultaneously cut.

The third spacer 400 is disposed under the optical filter 300. The third spacer 400 may be interposed between the optical filter 300 and the sensor part 10. The third spacer 300 is bonded to the bottom surface of the optical filter 300.

An outer peripheral portion of the third spacer 400 matches with an outer peripheral portion of the optical filter 300. That is, a lateral side of the third spacer 400 may be aligned on the same plane with a lateral side of the optical filter 300.

The third spacer 400 is opaque and includes plastic. The third spacer 400 may include a material the same as that of the first and second spacers 130 and 230. For instance, the third spacer 400 may include colored dye, such as black dye, and plastic. The third spacer 400 may include the plastic having high heat-resistance characteristic.

The plastic used for the third spacer 400 is rarely deformed at the temperature of about 200° C. to about 350° C. For instance, the glass transition temperature of the plastic used for the third spacer 400 is in the range of about 130° C. to about 250° C. Preferably, the glass transition temperature of the plastic used for the third spacer 400 is in the range of about 200° C. to about 250° C. In addition, the melting point of the plastic used for the third spacer 400 is in the range of about 350° C. to about 450° C.

The third spacer 400 may include thermoplastic resin, thermosetting resin or photo-curable resin. For instance, the third spacer 400 may include plastic having the high heat-resistance characteristic, such as polyether ether ketone (PEEK), polyethylene naphthalate (PEN), polyimide (PI) or liquid crystal polymer.

The third spacer 400, as a whole, can be formed by using the plastic. For instance, the third spacer 400 can be prepared as a single layer film. In contrast, the third spacer 400 may have a multi-layer structure. In this case, all layers constituting the second spacer 230 may include the plastic described above.

The third spacer 400 includes a third perforation hole 410. The third perforation hole 410 corresponds to the first and second lens parts 110 and 210. The center of the third perforation hole 410 substantially matches with the centers of the first and second lens parts 110 and 210.

An inner wall of the third perforation hole 410 may be inclined with respect to the top surface of the third spacer 400. In detail, the inner wall of the third perforation hole 410 may be inclined at an angle of about 40° to about 80° with respect to the top surface of the third spacer 400.

The inclination direction of the inner wall of the third perforation hole 410 is substantially identical to the route of the incident light. Thus, the angle of the inner wall of the third perforation hole 410 may vary depending on the optical design of the first and second lens units 100 and 200.

A diameter of the third perforation hole 410 is gradually enlarged proportionally to the distance with respect to the optical filter 300. In contrast, the diameter of the third perforation hole 410 may be gradually reduced proportionally to the distance with respect to the optical filter 300.

Since the inner wall of the third perforation hole 410 is inclined with respect to the top surface of the third spacer 400, the light can be effectively incident into the sensor part 10 by passing through the optical filter 300.

The first lens unit 100, the second lens unit 200, the optical filter 300 and the third spacer 400 are bonded with each other by adhesive layers (not shown).

For instance, an adhesive layer is interposed between the first spacer 130 and the first lens unit 100, and another adhesive layer is interposed between the first spacer 130 and the second lens unit 200. That is, the first spacer 130 maybe bonded to the first and second lens units 100 and 200 through the adhesive layers (not shown).

The adhesive layers include materials having high heat-resistance characteristic. For instance, the material used for the adhesive layers is rarely deformed at the temperature of about 200° C. to about 350° C. For instance, the material used for the adhesive layers may be plastic having the glass transition temperature in the range of about 130° C. to about 250° C. Preferably, plastic having the glass transition temperature in the range of about 200° C. to about 250° C. may be used for the adhesive layers. In addition, the melting point of the plastic used for the adhesive layers is in the range of about 350° C. to about 450° C.

The material used for the adhesive layers may include epoxy-based resin or acryl-based resin.

The sensor part 10 is disposed under the lens assembly 20. The sensor part 10 may be bonded to the lens assembly 20. The sensor part 10 senses the light incident through the lens assembly 20. The sensor part 10 includes a sensing chip 11 and a circuit substrate 12.

The sensing chip 11 converts the light incident from the lens assembly 20 into an electric signal. The sensing chip 11 is connected to the circuit substrate 12. The sensing chip 11 may include a plurality of semiconductor devices having the function of image sensing. The sensing chip 11 may be a semiconductor chip including silicon.

The circuit substrate 12 is electrically connected to the sensing chip 11. The circuit substrate 12 receives the electric signal from the sensing chip 11. The circuit substrate 12 may drive the sensing chip 11.

In this manner, the first and second lens units 100 and 200 including the lens parts 110 and 210 having the curved regions and the support parts 120 and 220 supporting the lens parts 110 and 210 are manufactured in separate processes, so that the first and second lens units 100 and 200 have the boundary regions. In addition, the lens parts 110 and 210 are formed in the support parts 120 and 220 having the strength, so that so that the resin constituting the lens parts 110 and 210 can be inhibited from moving caused by shrinkage of the lens parts 110 and 210.

In addition, the first lens unit 100, the second lens unit 200 and the optical filter are bonded with each other. Further, the sensor part 10 is bonded to the third spacer 400. Thus, the lens assembly 20 may have high mechanical strength.

Meanwhile, in order to reinforce the strength, the camera module according to the embodiment may include a housing for receiving the lens assembly 20 and the sensor part 10 therein. The housing may guide the lens assembly 20 and the sensor part 10. In addition, the housing may serve as a light blocking cover for blocking the light incident into the lateral sides of the lens assembly 20 and the sensor part 10.

In addition, the camera module according to the embodiment may include a light blocking layer. That is, an opaque material having the high heat-resistance characteristic is coated on the lateral sides of the lens assembly 20 and the sensor part 10 to form the light blocking layer.

The first lens unit 100, the second lens unit 200, the optical filter 300, the third spacer 400 and the adhesive layers may have the high heat-resistance characteristic.

Thus, the camera module according to the embodiment may have the high heat-resistance characteristic. Therefore, the camera module according to the embodiment may not be deformed when the reflow process is performed under the high temperature to bond the camera module according to the embodiment to the main substrate.

In addition, since the first to third spacers 130, 230 and 400 are opaque, the first to third spacers 130, 230 and 400 may block undesired light while removing the noise. That is, the lens units are spaced apart from each other by the first spacer 130 and spaced apart from the optical filter by the second spacer 230 so that the undesired light can be blocked.

Thus, the camera module according to the embodiment does not need an additional member, such as a stop interposed between the lens units for blocking the light, so the camera module may have the simple structure.

Hereinafter, a process for manufacturing the lens unit will be described with reference to FIGS. 4 to 8.

Figure 4:
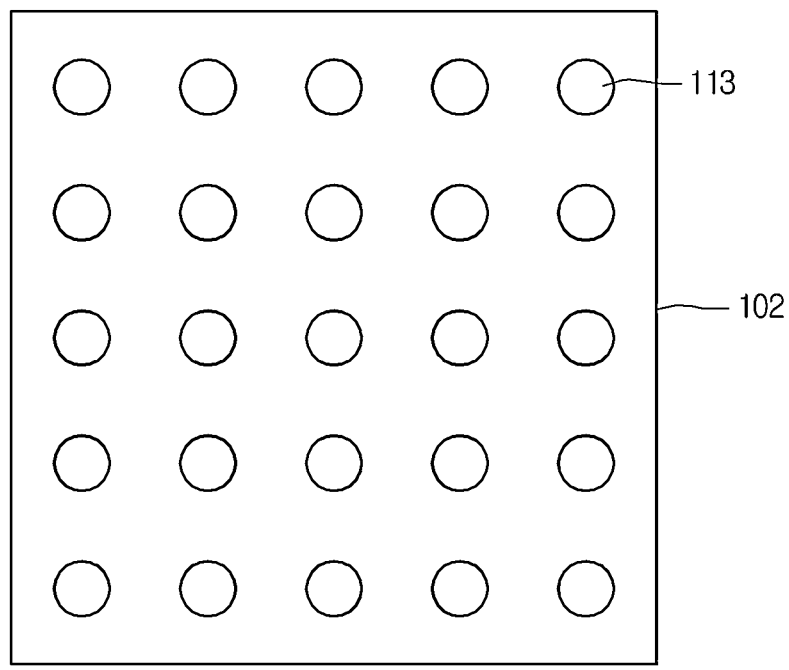
FIGS. 4 to 8 are views showing a process for manufacturing a lens unit.

First, a first preliminary lens array substrate 101 to form a support part 102 is prepared as shown in FIGS. 4 and 5.

The first preliminary lens array substrate 101 is formed by using a material the same as that of the support part 102. For instance, the first preliminary lens array substrate 101 is formed by using glass, thermosetting resin or photo-curable resin, so the first preliminary lens array substrate 101 has a strength.

The first preliminary lens array substrate 101 is divided into regions to form a plurality of first lens units and an opening 113 is formed at a portion of each region where the lens part 110 will be formed. Thus, the openings 113 are arrayed in the first preliminary lens array substrate 101.

The opening 113 has a width larger than the diameter of the curved region of the lens part 110 which is in the range of about 0.5 mm to about 3 mm. The opening 113 preferably has the width in the range of 1 mm to 4 mm.

Meanwhile, an align mark can be formed on a predetermined region of the first preliminary lens array substrate 101 to laminate each camera lens. The align mark can be formed through a photo mask scheme.

Figure 6:
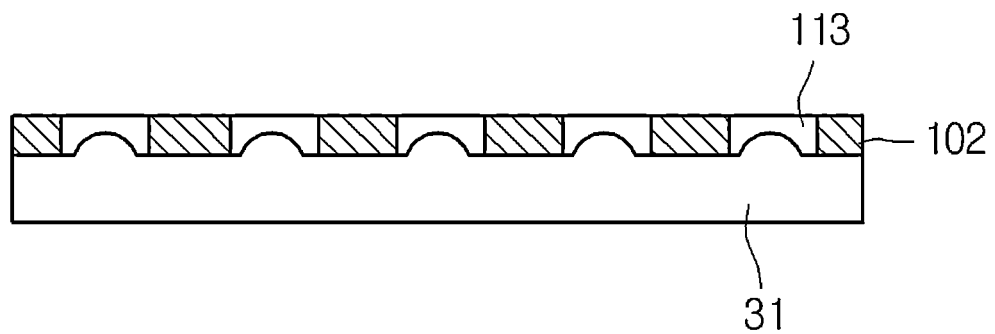
Figure 7:
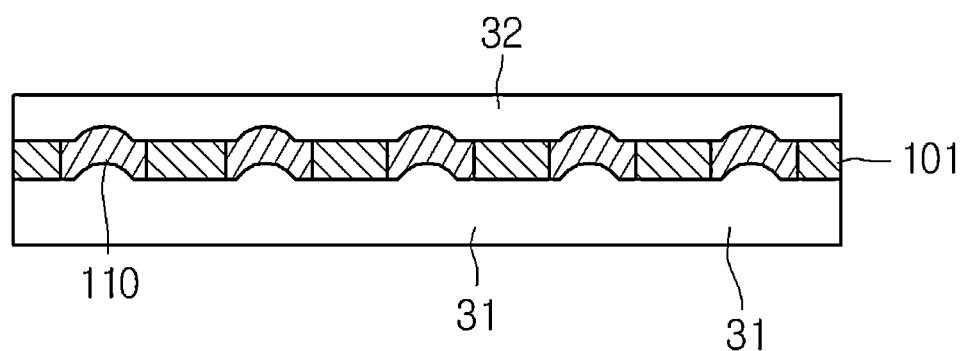

As shown in FIG. 6, the first preliminary lens array substrate 101 is disposed on a first forming mold 31.

The first forming mold 31 has convex patterns aligned with the openings 113. The convex patterns correspond to the curved region of the first lens part 110, but the width of the convex pattern is smaller than the width of the opening 113.

In a state that the convex patterns of the first forming mold 31 are aligned with the openings 113 of the first preliminary lens array substrate 101, a resin material is coated to form the first lens part 110.

In a state that the resin material has been coated, as shown in FIG. 6, a second forming mold 32 is disposed on the first preliminary lens array substrate 101. The second forming mold 32 has a plurality of convex patterns aligned with the openings 113 of the first preliminary lens array substrate 101.

Thus, the resin material having the curved region is filled in the openings 113 of the first preliminary lens array substrate 101 by the first and second forming molds 31 and 32 and the resin material is cured by heat or light, so that the first lens part 110 is formed.

Figure 8:
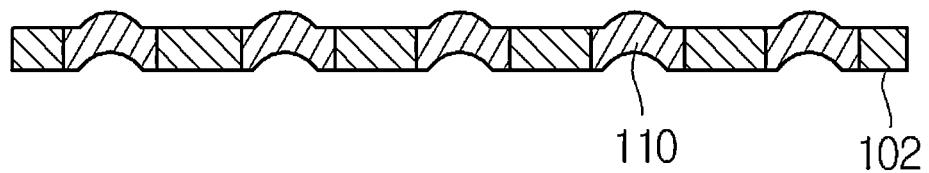

Then, the first preliminary lens array substrate 101 is separated from the first and second forming molds 31 and 32, so that the first preliminary lens array substrate 101 having the shape as shown in FIG. 8 can be obtained.

In the case of the first preliminary lens array substrate 101 shown in FIG. 8, the curing point of the material for the support part 102 is different from the curing point of the material for the lens part 110, so the hole is primarily formed in the support part 102 having the strength and the lens part 110 is formed in the hole, thereby inhibiting the movement of the resin caused by shrinkage of the lens part 110 when the lens part 110 is cured.

A second preliminary lens array substrate 201 having a plurality of second lens units 200 can also be formed through the above process.

Although the first and second lens units 100 and 200 as shown in FIGS. 1 and 3 have been described, the lens units 100 and 200 may be manufactured in various shapes.

Hereinafter, the process for forming the lens assembly will be described with reference to FIGS. 9 to 12.

Figure 9:
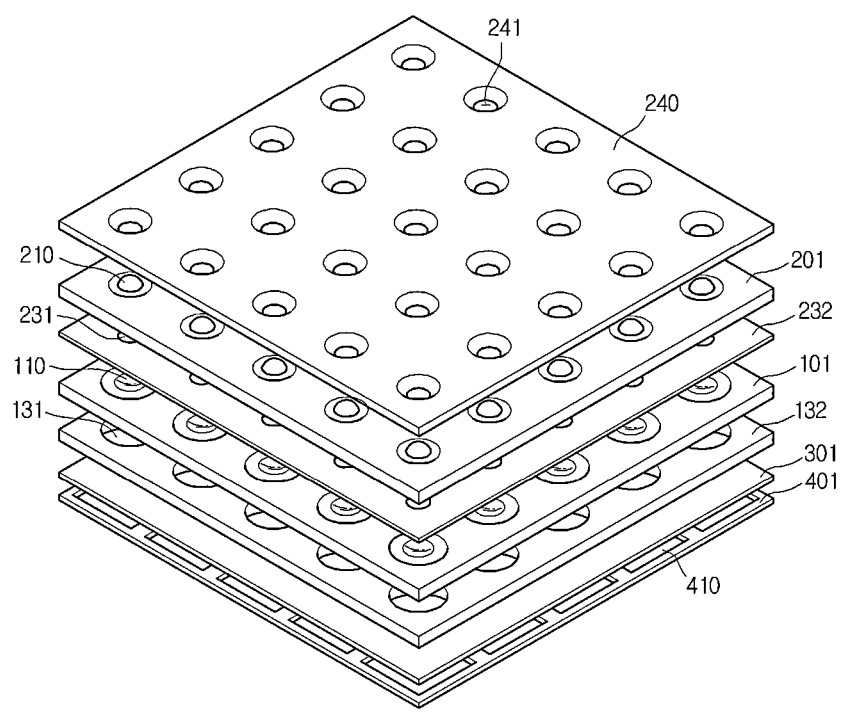
FIGS. 9 to 12 are views showing a process for manufacturing a camera module according to the embodiment.
Figure 10:
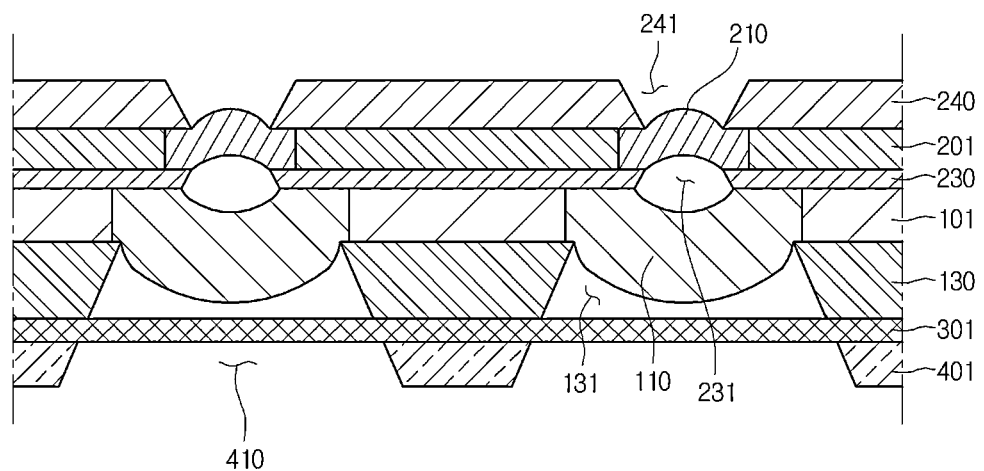

First, as shown in FIGS. 9 and 10, a third film 401, an optical filter plate 301, a second film 232, the first lens array substrate 101, a first film 132, a second lens array substrate 201 and the light blocking plate 240 are sequentially laminated and bonded with each other.

The optical filter plate 301 has the structure the same as that of the optical filter 300 described above. That is, the optical filter plate 301 has the optical characteristic and thickness the same as those of the optical filter 300.

The third film 401 includes a plurality of third perforation holes 410. The third film 401 is formed by using the material the same as that of the third spacer 400 of the camera module described above. In addition, the third film 401 has the thickness the same as that of the third spacer 400.

The second and first films 232 and 132 include a plurality of second and first perforation holes 231 and 131, respectively, and can be formed by using the material the same as that of the second and first spacers 230 and 130.

In addition, the first lens parts 110, the second lens parts 210, the first perforation holes 131, the second perforation holes 231, the third perforation holes 410 and the fourth perforation holes 241 are aligned with each other.

In this state, the third film 401, the optical filter plate 301, the second film 22, the first lens array substrate 101, the first film 132, the second lens array substrate 201 and the light blocking plate 240 are sequentially laminated and bonded with each other.

Figure 11:
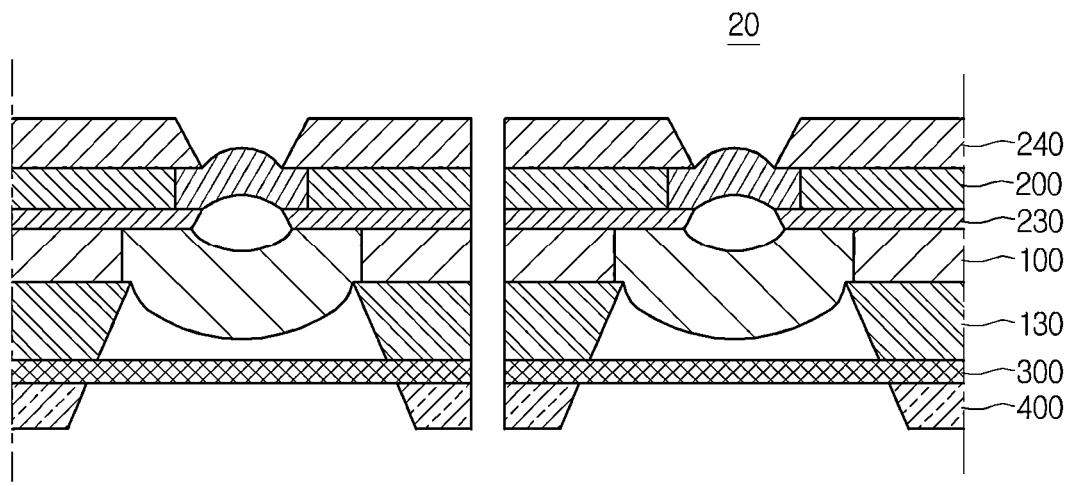

Referring to FIG. 11, the third to first films 401, 232 and 132, the optical filter plate 301, the first lens array substrate 101 and the second lens array substrate 201 are simultaneously cut so that a plurality of lens assemblies 20 are formed.

That is, the first lens array substrate 101 is cut into regular square shapes or rectangular shapes so that the first lens array substrate 101 is divided into a plurality of first lens units 100.

In the same manner, the second lens array substrate 201, the optical filter plate 301 and the third film 401 are divided into a plurality of second lens units 200, optical filters 300 and third spacers 400.

In contrast, the third film 401 and the optical filter plate 301 can be separately bonded and cut. In addition, after the first lens array substrate 201, the first film 132 and the second lens array substrate 201 have been laminated, the first lens array substrate 201, the first film 132 and the second lens array substrate 201 can be bonded with each other and cut simultaneously. Then, the optical filters 300 are bonded to the first lens units 100, respectively, so that the lens assemblies 20 according to the embodiment can be obtained.

Figure 12:
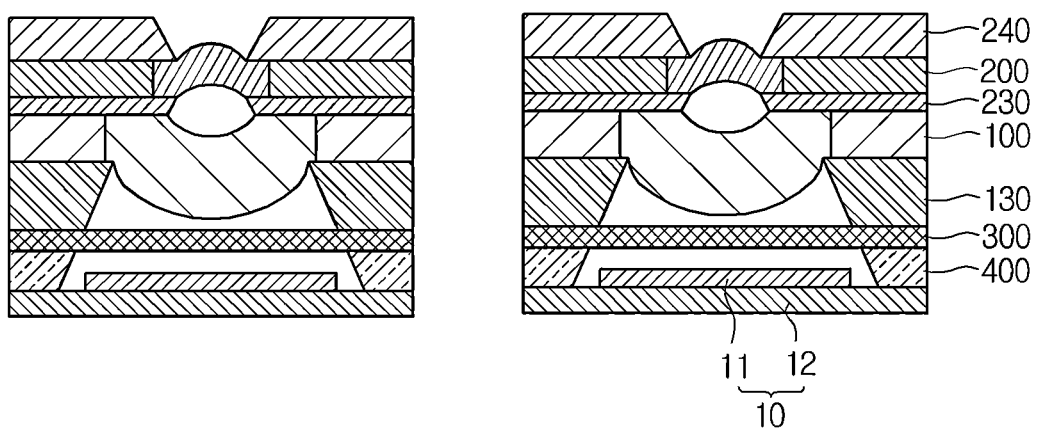

Referring to FIG. 12, the sensor parts 10 are bonded to the lens assemblies 20, respectively, so that the camera module according to the embodiment can be obtained.

In this manner, since the third film 401, the optical filter plate 301, the first lens array substrate 101, and the second lens array substrate 201 are simultaneously cut, the first lens unit 100, the second lens unit 200, the optical filter 300 and the third spacer 400 may have the same cutting surface.

In addition, if the third film 401, the optical filter plate 301, the first lens array substrate 101, and the second lens array substrate 201 include the same plastic, the third film 401, the optical filter plate 301, the first lens array substrate 101, and the second lens array substrate 201 may have the similar mechanical characteristic, so the third film 401, the optical filter plate 301, the first lens array substrate 101, and the second lens array substrate 201 can be readily cut.

Therefore, according to the manufacturing method of the embodiment, the lens assemblies 20 can be readily manufactured and the camera module may have the superior heat-resistance characteristic, mechanical characteristic, and optical characteristic.

Figure 13:
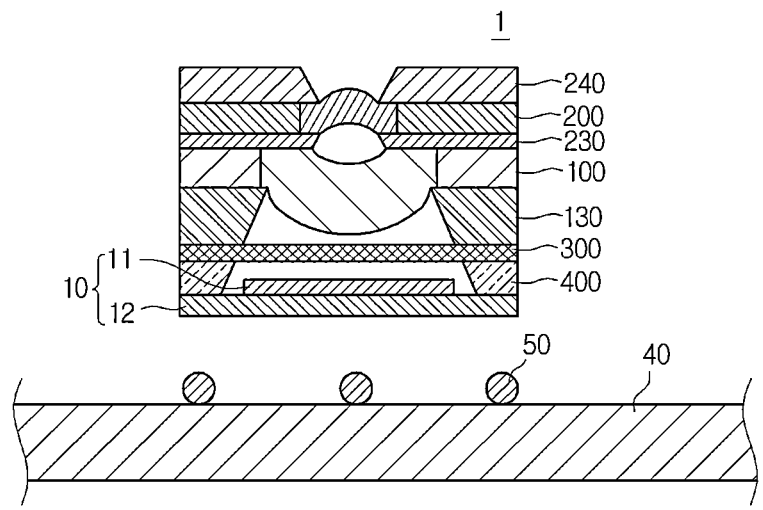
FIGS. 13 and 14 are views showing a procedure for bonding a camera module to a main circuit substrate according to the embodiment.
Figure 14:
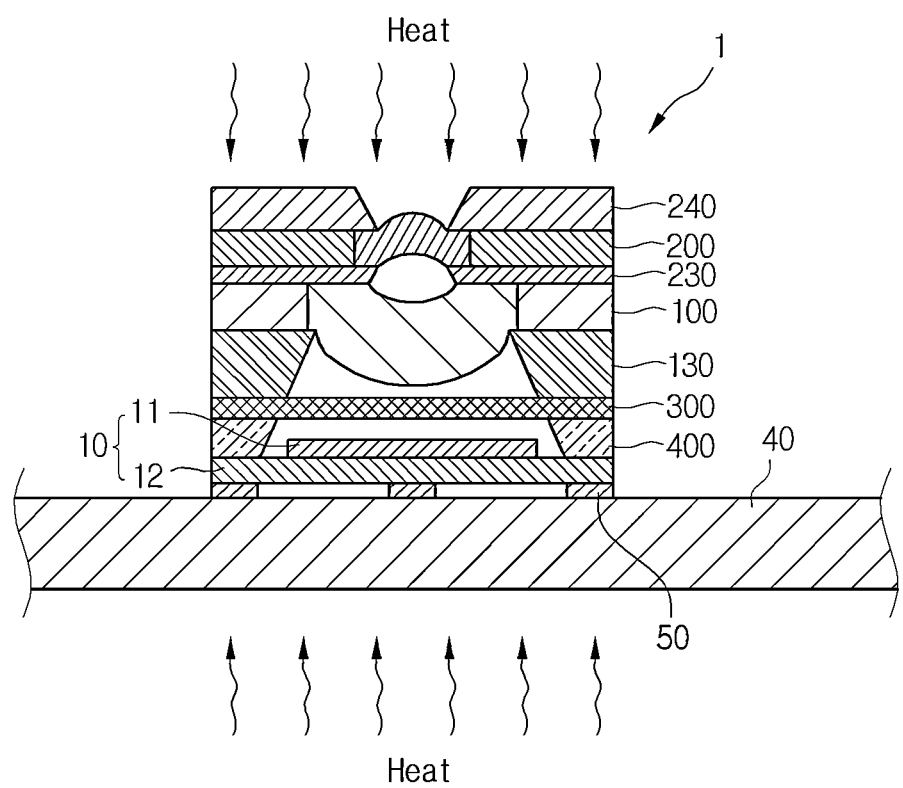

FIGS. 13 and 14 are views showing the procedure for bonding the camera module 1 to the main substrate 40 according to the embodiment.

Referring to FIG. 13, a plurality of solders 50 are disposed on the main substrate 40. Then, the camera module 1 according to the embodiment is aligned on the solders 50.

Referring to FIG. 14, after the camera module 1 according to the embodiment has been aligned on the solders 50, heat is applied to the solders 50, the main substrate 40 and the camera module 1.

Thus, the temperature of the solders 50 and the camera module 1 according to the embodiment may rise in the range of about 200° C. to about 300° C. Thus, the solders 50 are softened and the camera module 1 according to the embodiment is bonded to the main substrate 40.

At this time, since the camera module 1 according to the embodiment has the high heat-resistance characteristic, the above reflow process can be carried out. In addition, the camera module 1 according to the embodiment may not be deformed during the reflow process.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although a preferred embodiment of the disclosure has been described for illustrative purposes, those skilled in the art will appreciate that various modifications, additions and substitutions are possible, without departing from the scope and spirit of the invention as disclosed in the accompanying claims.

What is claimed is:

1. A camera module comprising: a first lens unit comprising a first lens part including a curved region having a predetermined curvature, and a support part including a hole, in which the lens part is installed, and attached to the lens part at a lateral side of the hole; an opaque spacer on the first lens unit; a second lens unit on the spacer; and a sensor part under the first lens unit wherein the second lens unit comprises: a second lens part including a curved region corresponding to the first lens part; and a second support part including a hole, in which the second lens part is installed, and attached to the second lens part at a lateral side of the hole.

2. The camera module of claim 1 wherein the spacer includes a perforation hole to expose the curved regions of the first and second lens parts, and the perforation hole deviates from a boundary region between the first lens part and the first support part and a boundary region between the second lens part and the second support part.

3. A method of manufacturing a lens unit, the method comprising: preparing a preliminary lens array substrate including an opening for exposing a lens region where a lens part is formed;

placing the preliminary lens array substrate at an inside of a mold;

forming the lens part in the opening by injecting a resin material into the inside of the mold such that the opening is filled with the resin material and curing the resin material;

and cutting the preliminary lens array substrate wherein the forming of the lens part comprises forming a spacer over or under the support part and the lens part to open a curved region of the lens part; and wherein a boundary region between the support part and the lens part deviates from an open region of the spacer such that the boundary region is not exposed through the open region.

4. The method of claim 3, wherein the mold includes a pattern to form a curved region of the lens part, and a width of the opening is larger than a size of the pattern.

5. The method of claim 4, wherein the lens part includes a flat region surrounding the curved region.

6. The method of claim 5, wherein the flat region of the lens part is bonded to a lateral side of the opening of the support part.

7. The method of claim 3, wherein the preliminary lens array substrate includes glass, thermoplastic resin, photocurable resin, or thermosetting resin.

8. The method of claim 3, wherein the preliminary lens array substrate includes a material different from the resin material to form the lens part.

9. The method of claim 3, wherein the forming of the lens part comprises bonding the lens part to a lateral side of the opening of the preliminary lens array substrate.

10. The method of claim 3, wherein the preparing of the preliminary lens array substrate having a strength comprises forming an align mark at a predetermined region of the preliminary lens array substrate.

* * * * *